United States Patent
Kerr et al.

(10) Patent No.: US 12,494,631 B2
(45) Date of Patent: Dec. 9, 2025

(54) TEMPERATURE-COMPENSATED INTERRUPTER FIRING CIRCUIT

(71) Applicant: G & W Electric Company, Bolingbrook, IL (US)

(72) Inventors: Blair S. Kerr, Downers Grove, IL (US); Allen David Steinberg, St. Charles, IL (US); Nicholas Jackson Emerson, Addison, IL (US); Bernardo Hasbach Covian, Romeoville, IL (US)

(73) Assignee: G & W Electric Company, Bolingbrook, IL (US)

( * ) Notice: Subject to any disclaimer, the term of this patent is extended or adjusted under 35 U.S.C. 154(b) by 143 days.

(21) Appl. No.: 18/432,681

(22) Filed: Feb. 5, 2024

(65) Prior Publication Data
US 2025/0253639 A1   Aug. 7, 2025

(51) Int. Cl.
*H02B 1/20* (2006.01)
*H02H 3/02* (2006.01)
*H02H 3/08* (2006.01)

(52) U.S. Cl.
CPC .............. *H02H 3/085* (2013.01); *H02B 1/20* (2013.01); *H02H 3/021* (2013.01)

(58) Field of Classification Search
CPC .......... H02B 1/20; H02H 3/021; H02H 3/085; H02H 5/041; H02H 3/08; H02H 1/0007; H02M 1/32; H02M 1/0009; H02M 1/36; H01H 39/006; H01H 85/0039; H01H 85/12
USPC .... 361/18, 93.1, 87, 91.1, 93.9, 102, 125, 2, 361/93.7; 363/21.01, 50; 323/284; 218/95; 337/30, 243, 4, 401
See application file for complete search history.

(56) References Cited

U.S. PATENT DOCUMENTS

| | | | |
|---|---|---|---|
| 4,479,105 A | 10/1984 | Banes | |
| 4,920,446 A | 4/1990 | Pflanz | |
| 9,953,783 B2 * | 4/2018 | Fellmer | H01H 39/006 |
| 10,328,801 B2 | 6/2019 | Kube | |
| 10,418,212 B2 * | 9/2019 | Warenits | H01H 9/32 |
| 10,483,062 B2 | 11/2019 | Sugisawa | |
| 11,201,027 B2 | 12/2021 | Ehrhardt et al. | |
| 11,594,383 B2 * | 2/2023 | Fukuda | H01H 39/00 |

(Continued)

FOREIGN PATENT DOCUMENTS

| | | |
|---|---|---|
| CA | 1228101 A | 10/1987 |
| CA | 1266289 A | 2/1990 |

OTHER PUBLICATIONS

Nexperia, PSSI2021SAY LTSpicem, <https://www.nexperia.com/products/automotive-qualified-products-aec-q100-q101/automotive-bipolar-transistors/general-purpose-bipolar-transistors/led-driver/PSSI2021SAY.html> publicly available as early as Aug. 18, 2022 (1 page).

(Continued)

*Primary Examiner* — Elim Ortiz
(74) *Attorney, Agent, or Firm* — Michael Best & Friedrich LLP

(57) ABSTRACT

In one example, a circuit interrupter includes a bus bar configured to conduct a current. The bus bar is configured to connect to an electrical grid. The circuit interrupter includes a bus bar cutter configured to sever the bus bar, a resistance-temperature-coefficient (RTC) circuit configured to provide a temperature-compensated delay, and a detonator firing circuit configured to trigger the bus bar cutter in response to the temperature-compensated delay.

15 Claims, 8 Drawing Sheets

(56) References Cited

U.S. PATENT DOCUMENTS

| | | |
|---|---|---|
| 11,764,025 B2 | 9/2023 | Ehrhardt et al. |
| 2006/0099789 A1* | 5/2006 | Mitchell ............. H01L 23/3114 |
| | | 257/E21.504 |
| 2010/0328014 A1* | 12/2010 | Suzuki ................. H01H 39/006 |
| | | 337/30 |
| 2016/0343524 A1* | 11/2016 | Gaudinat .................. B60L 3/04 |
| 2019/0108957 A1* | 4/2019 | Volkmann ............ H01H 39/006 |
| 2019/0244778 A1 | 8/2019 | Dariavach et al. |
| 2021/0183607 A1 | 6/2021 | Schlaak et al. |
| 2022/0013320 A1 | 1/2022 | Ehrhardt et al. |
| 2022/0368123 A1 | 11/2022 | Van Besouw et al. |
| 2023/0141970 A1* | 5/2023 | Douglass ............... H02H 7/268 |
| | | 337/157 |

OTHER PUBLICATIONS

G&W Electric Co., PAF Power Assisted Fuse, Catalog SG4-41B, dated Jan. 1993 (4 pages).

G&W Electric Co., CLIP Current Limiting Protector, GW20-SG4-31J, dated Oct. 2005 (8 pages).

\* cited by examiner

TEMPERATURE-COMPENSATED INTERRUPTER FIRING CIRCUIT

FIELD

Examples relate to current limiting protectors for use in medium voltage (for example, 2.8 to 38 kV) electrical power distribution systems.

BACKGROUND

Nodes in an electrical power distribution system (sometimes, simply a "power distribution system") may experience overcurrent events for various reasons. For example, a short circuit near a node may cause an overcurrent event. In some cases, an overcurrent event is transient. However, in other cases, the overcurrent event is longer lasting (e.g., in the case of a fault in a power distribution network). Systems configured to react to the overcurrent events may improve functioning of the power distribution system.

SUMMARY

Accordingly, embodiments, examples, features, and aspects provide, among other things, methods and systems for interrupting a circuit by severing a bus bar after a temperature-compensated delay time.

One example provides a circuit interrupter including a bus bar configured to connect to an electrical grid and conduct a current. The circuit interrupter also includes a bus bar cutter configured to sever the bus bar, a temperature compensation circuit including a resistance-temperature-coefficient (RTC) circuit configured to provide a temperature-compensated delay, and a detonator firing circuit configured to trigger the bus bar cutter in response to the temperature-compensated delay.

Another example provides a system including a temperature compensation circuit including an RTC circuit. The RTC circuit is configured to provide a temperature-compensated delay for a bus bar cutter configured to sever a bus bar. The system also includes a detonator firing circuit configured to trigger the bus bar cutter in response to the temperature-compensated delay.

Another example provides a method of controlling a circuit interrupter. The method includes measuring, via a current sensing circuit, an amount of current being conducted across a bus bar. The method further includes providing, via a temperature compensation circuit including an RTC circuit, a temperature-compensated delay for a bus bar cutter configured to sever a bus bar. The method further includes triggering, via the temperature compensation circuit, the bus bar cutter in response to the temperature-compensated delay.

Other embodiments, examples, features and aspects will become apparent by consideration of the detailed description and accompanying drawings.

DETAILED DESCRIPTION

Before any embodiments, examples, features, and aspects are explained in detail, it is to be understood that examples described and illustrated are not limited in their application to the details of construction and the arrangement of components set forth in the following description or illustrated in the following drawings. The examples described and illustrated may be practiced or carried out in various ways and other implementations are possible.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it were stated in this document that "item Z may comprise element A or B," this may be interpreted to disclose an item Z comprising only element A, an item Z comprising only element B, as well as an item Z comprising elements A and B.

Figure 1:
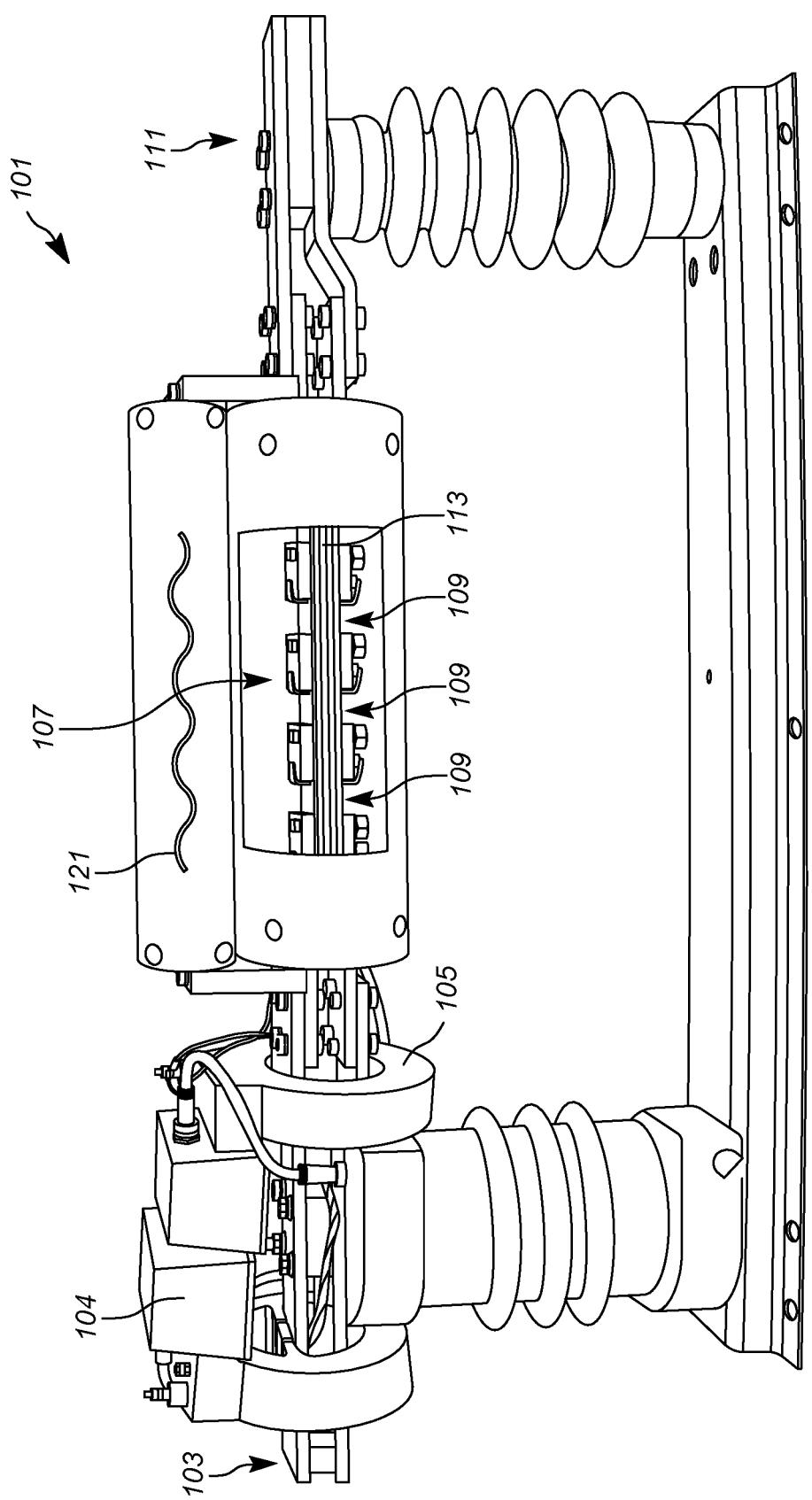
FIG. 1 depicts a circuit interrupter, according to some examples.

FIG. 1 depicts a circuit interrupter 101 including a power system connection 103, a firing logic circuit 104, a current sensing circuit 105, and a bus bar 107. Bus bar cutters 109 are disposed along the length of an insulator 113 supporting the bus bar 107, and a fuse element 121 is electrically connected in parallel with the bus bar 107. Electricity (e.g., electricity from a power distribution system such as an electrical grid) flows through the power system connection 103 to the bus bar 107 and through the bus bar 107 to a bus bar connection 111. The current sensing circuit 105 is configured to measure one or more parameters of current being conducted through the bus bar 107 as electricity flows through the bus bar 107 such as, for example, the amount of current. The current sensing circuit 105 may be part of the firing logic circuit 104. If the current measured by the current sensing circuit 105 surpasses a predetermined current threshold (e.g., 1,000 Amps, 5,000 Amps, 7,000 Amps, 10,000 Amps, 12,000 Amps, 15,000 Amps, 20,000 Amps, 25,000 Amps, 35,000 Amps, 40,000 Amps, 42,000 Amps, 45,000 Amps or any values between these thresholds), the current sensing circuit 105 communicates this via a signal (for example, an analog signal) to other functional circuits of the circuit interrupter 101. As will be described in a greater detail below, the other functional circuits of the circuit interrupter 101 cause the bus bar cutters 109 to sever the bus bar 107 (e.g., by use of explosive charges) in response to the signal. The severing of the bus bar 107 interrupts the current flowing from the power system connection 103 to the bus bar connection 111, through the bus bar 107.

Figure 2:
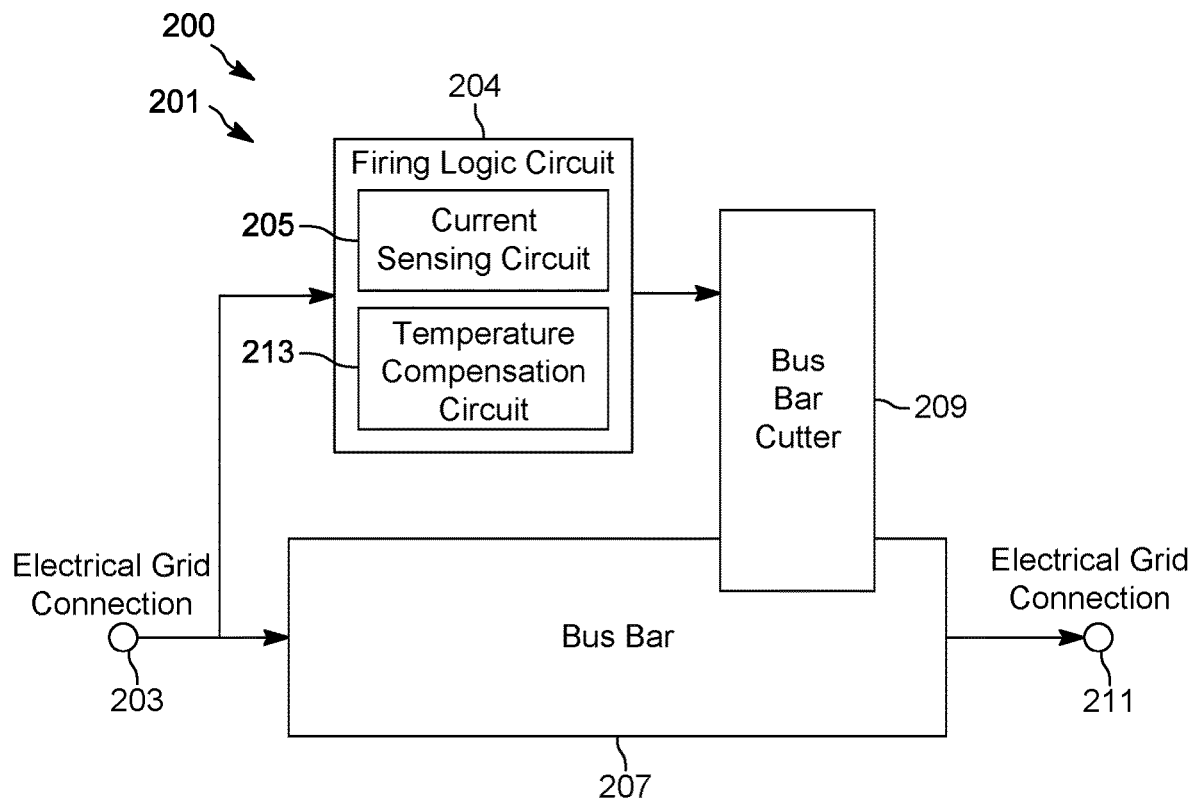
FIG. 2 depicts a schematic diagram of a circuit interrupter, according to some examples.

FIG. 2 depicts a schematic diagram 200 of a circuit interrupter 201. The circuit interrupter 201 includes a first electrical grid connection 203, a firing logic circuit 204, a bus bar 207, a bus bar cutter 209, and second electrical grid connection 211. The firing logic circuit 204 includes a current sensing circuit 205 and a temperature compensation circuit 213. The current sensing circuit 205 is configured to measure the amount of current being conducted via the bus bar 207 from the first electrical grid connection 203 to the second electrical grid connection 211. The temperature compensation circuit 213 is configured to provide a temperature-compensated delay time (sometimes, simply a "temperature-compensated delay") for a triggering of the bus bar cutter 209. The bus bar cutter 209 is configured to rapidly sever the bus bar 207 when triggered by the firing logic circuit 204.

Temperature changes in conductors and integrated circuits can cause changes in current flowing through the conductors and integrated circuits. This phenomenon might cause a non-linear circuit element of a circuit interrupter 201 to reach a steady-state quicker than desired, causing a pre-mature triggering of a bus bar cutter 209, or may cause the non-linear circuit element to reach a steady-state slower than desired, causing a late triggering of the bus bar cutter 209. The firing logic circuit 204 shown in FIG. 2 helps to mitigate this problem by using the temperature compensation circuit 213 to help prevent premature triggering of the bus bar cutter 209 in response to certain types of temporary overcurrent events on the bus bar 207. For example, the temperature compensation circuit 213 may be configured to help ensure that the bus bar cutter 209 is only triggered in response to the current sensing circuit 205 sensing current sustained above a predetermined current threshold (e.g., above 10,000 Amps) over a certain delay range (e.g., 80 us to 100 µs). An overcurrent event of this magnitude and duration may occur as a result of, for example, a short circuit in a load in the power distribution system.

The current sensing circuit 205 may include a clamp meter, an integrated circuit (IC), a Hall effect sensor, a current sensing transformer (e.g., a Rogowski coil), other current sensors, or a combination thereof. As will be discussed in further detail below, the temperature compensation circuit 213 may include a resistance-temperature-coefficient (RTC) circuit configured to help ensure that a non-linear circuit element (e.g., a capacitor) reaches a steady state with a substantially constant delay time despite changes in a temperature of the components of the firing logic circuit 204.

In response to being triggered, the bus bar cutter 209 severs the bus bar 207, thereby cutting off or terminating current flow to the second electrical grid connection 211 through the bus bar 207. In some examples, the severing of the bus bar 207 causes a commutation of the current flow to a fuse element (e.g., fuse element 121) that is electrically connected in parallel with the bus bar 207.

Figure 3A:
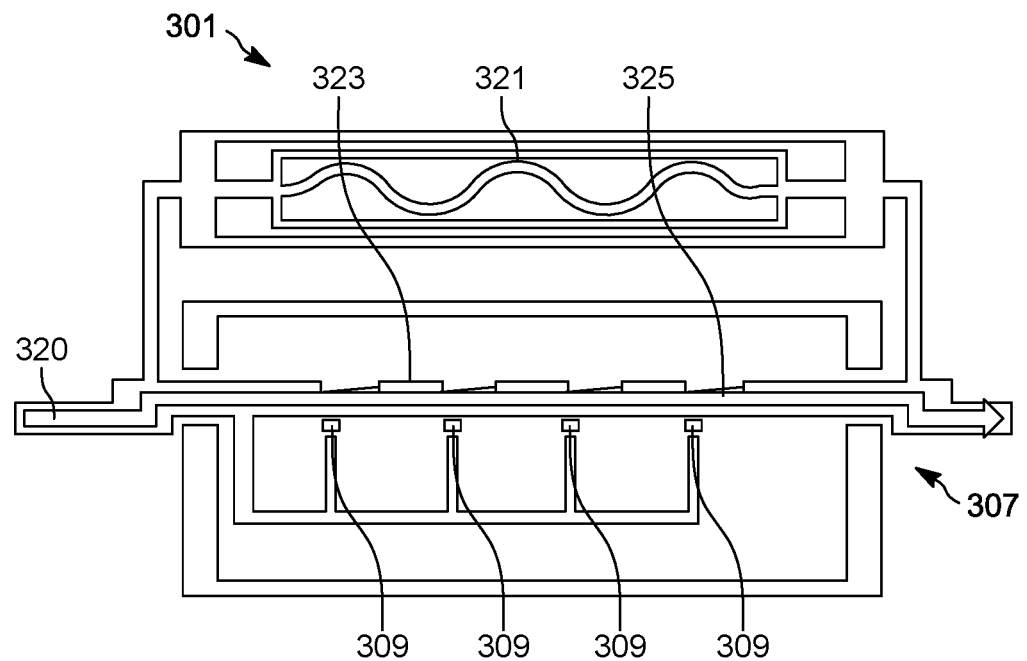
FIG. 3A depicts a bus bar configured to be severed by bus bar cutters, according to some examples.
Figure 3B:
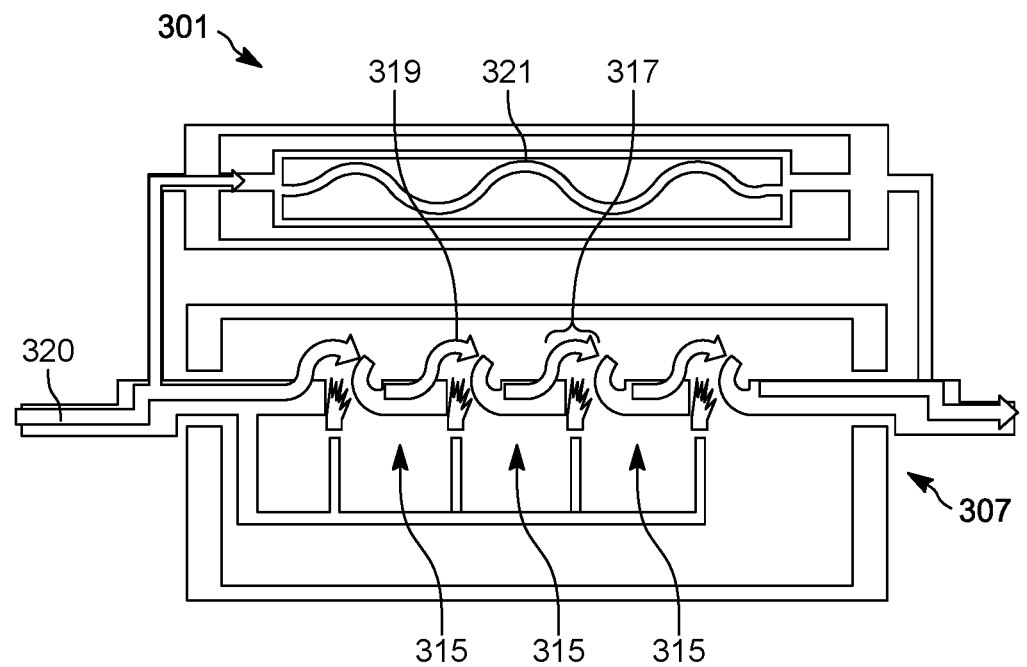
FIG. 3B depicts the bus bar of FIG. 3A being severed by bus bar cutters, according to some examples.

FIGS. 3A and 3B depict a circuit interrupter 301 that includes a bus bar 307 and bus bar cutters 309. In the example shown in FIG. 3A, the bus bar cutters 309 are explosive charges configured to cause a linear segmentation of the bus bar 307. As shown in FIG. 3B, when the bus bar cutters 309 are triggered by the firing logic circuit 204, the bus bar cutters 309 explode and segment the bus bar 307 into a number of fractional lengths 315. The fractional lengths 315 are displaced (e.g., bent upward) by the explosions, forming multiple gaps 317. Electrical arcs 319 form at these gaps 317 and resultant arc voltage causes a commutation of the current 320 flowing through the bus bar 307 to a current limiting fuse 321 arranged in parallel with the bus bar 307. As a result of the commutation of the current 320, the current limiting fuse 321 melts, an open circuit is created, and current flow is interrupted.

The bus bar 307 may be an elongated copper conductor. In some cases, the bus bar 307 may have thicker areas 323 and thinner areas 325. The thicker areas 323 may be configured to accommodate mechanical fasteners (not shown) to secure the bus bar 307 to an insulator (e.g., insulator 113). The thinner areas 325 of the bus bar 307 may be configured to be severed by the bus bar cutters 309 in a manner that displaces at least part of the bus bar 307. In some examples, after being severed, the thinner areas 325 of the bus bar 307 curl upward or backward over themselves toward the thicker areas 323.

Figure 4A:
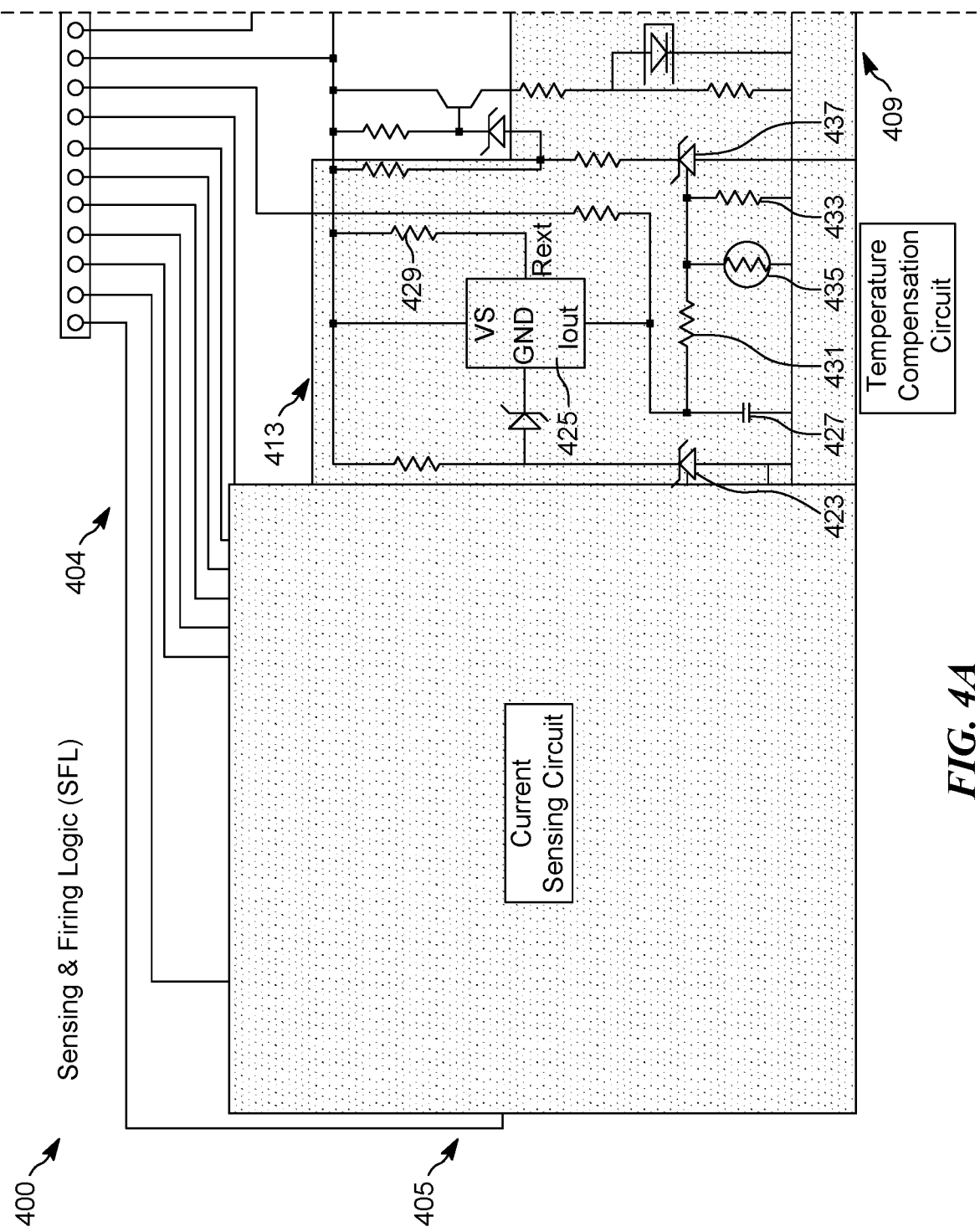
FIG. 4A depicts a circuit diagram of a firing logic circuit of the circuit interrupter including a current sensing circuit and a temperature sensing circuit, according to some examples.
Figure 4B:
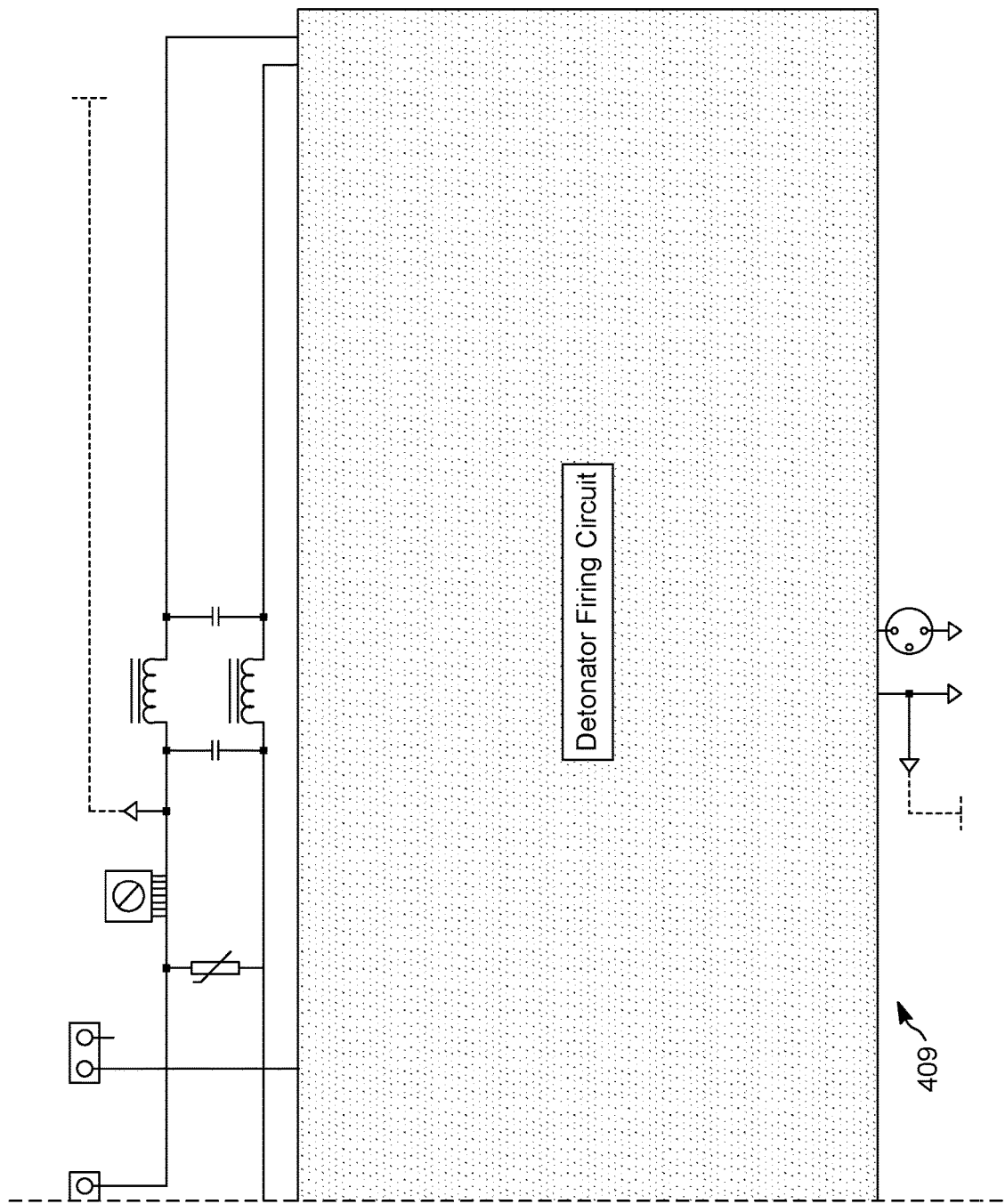
FIG. 4B is a continuation of the circuit diagram of the firing logic circuit of FIG. 4A and depicts a detonator firing circuit, according to some examples.

FIGS. 4A and 4B together depict a circuit diagram 400 for the firing logic circuit 404 of a circuit interrupter 101, 201, or 301 including a current sensing circuit 405, a detonator firing circuit 409, and a temperature compensation circuit 413. In the example shown, these circuits are represented as segments of a single circuit, but may be configured as interconnected circuit boards.

In the example shown, the current sensing circuit 405 includes a current transformer configured to measure a current being conducted across the bus bar 307. A first integrated circuit 423 is configured to turn on when current at or above a predetermined current threshold (e.g., 10,000 Amps of current) is sensed on the bus bar 307. In response to the current sensing circuit 405 detecting that the current on the bus bar 307 meets or exceeds the predetermined current threshold, the first integrated circuit 423 sends a signal to a current regulator 425. In response to receiving the signal from the first integrated circuit 423, the current regulator 425 produces a current $I_{out}$ which causes a delay capacitor 427 of the temperature compensation circuit 413 to charge to a predetermined voltage threshold over a period time referred to herein as a delay time. The temperature compensation circuit 413 includes a first resistor 429, a second resistor 431, a third resistor 433, a resistance temperature detector (RTD) 435, and the delay capacitor 427. As will be described in further detail below, this arrangement is configured to compensate for changes in a current output of the current regulator 425 caused by changes in a temperature of the current regulator 425. This temperature compensation helps ensure that the delay time remains substantially constant, despite changes of the temperature of the current regulator 425. Specifically, as a result of the temperature compensation, the delay capacitor 427 charges with a more predictable, temperature-compensated delay time that is less affected by the temperature of the current regulator 425.

The voltage of the delay capacitor 427 reaches a predetermined voltage threshold (e.g., 2.5V) at a time corresponding to the expiration of the temperature-compensated delay time. Specifically, the charging time of the delay capacitor 427 defines the temperature-compensated delay time.

A second integrated circuit 437 measures a voltage across the third resistor 433 and the RTD 435. The measured voltage corresponds to the voltage of the delay capacitor 427. The second integrated circuit 437 sends a signal to the detonator firing circuit 409 in response to the measured voltage indicating that the delay capacitor 427 has reached the predetermined voltage threshold (i.e., at the expiration of the temperature-compensated delay time). In response to receiving the signal from the second integrated circuit 437, the detonator firing circuit 409 triggers the bus bar cutters 309 to sever the bus bar 307, as described with respect to FIG. 3B. The severing of the bus bar 307 renders the bus bar 307 unable to conduct current.

In some examples, the first integrated circuit 423 is configured to communicate a signal to the current regulator 425 only so long as the predetermined current threshold is met or exceeded. In such examples, the current regulator 425 is configured to produce current Lout only so long as the signal is being received from the first integrated circuit 423. If the current measured by the current sensing circuit 405 drops below the predetermined current threshold, the first integrated circuit 423 stops communicating the signal to the current regulator 425, the current regulator 425 stops producing the current that causes the delay capacitor 427 to charge, and the detonator firing circuit is consequently never signaled by the second integrated circuit 437. In some cases, the delay capacitor 427 is allowed to completely discharge, and the temperature-compensated delay time is consequently reset.

The current sensing circuit 405, the detonator firing circuit 409, and the temperature compensation circuit 413 as shown in FIGS. 4A and 4B may correspond to the current sensing circuit 205, bus bar cutter 209, and temperature compensation circuit 213 of FIG. 2, respectively.

Figure 5:
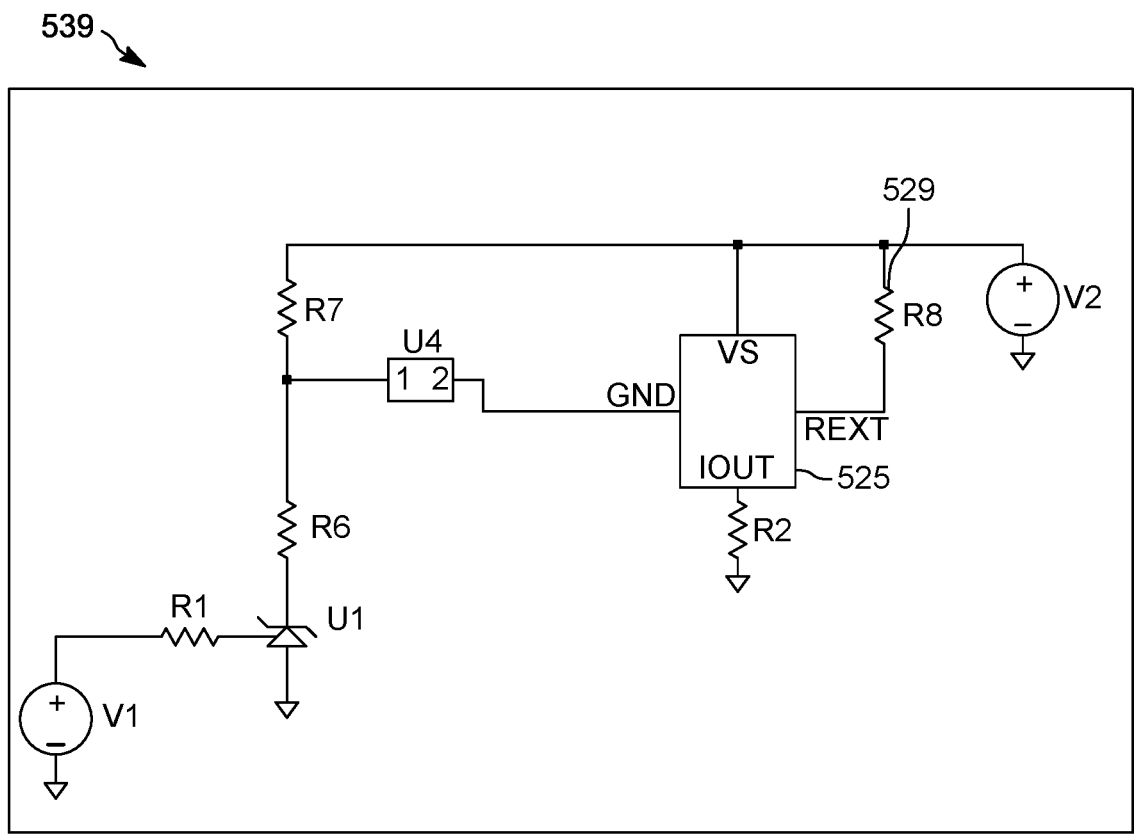
FIG. 5 depicts a simplified current regulator circuit, according to some examples.

FIG. 5 depicts simplified current regulator circuit 539. An equation for the output of the current regulator 525 $I_{out}$ can expressed as a function of the resistance of the first resistor 529 and the temperature T of the current regulator 525. $I_{out}$ is linear with temperature:

$$I_{out} = m(R)T + b(R)$$

where R is the resistance of the first resistor 529, and where m and b (slope and intercept) are functions of the value of the first resistor 529. This means that the resistance of the first resistor 529 should be chosen to set a base level of current $I_{out}$ output by the current regulator 525.

An equation for the current $I_{out}(R, T)$ has been empirically created based on test data and simulations and can be expressed as:

$$\frac{T}{-4.400 \cdot 10^{-5}R^2 - 0.06533R + 2.6969} + \frac{1}{-9.42 \cdot 10^{-8}R^2 + 0.001371R + 0.008505}$$

where R is the resistance of the first resistor 529.

As will be described in greater detail below, an RTC circuit is connected to the output of the current regulator 525, to help ensure that variances in the delay time due to changes in the temperature of the current regulator 525 are greatly reduced.

Figure 6:
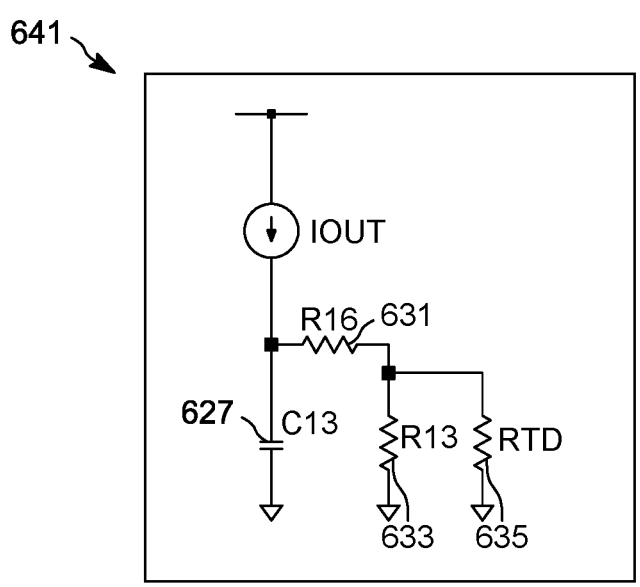
FIG. 6 depicts a simplified resistance-temperature-coefficient (RTC) circuit, according to some examples.

FIG. 6 depicts an RTC circuit 641 including a resistor capacitor network. The RTC circuit 641 corresponds to a sub-circuit of the temperature compensation circuit shown in FIG. 4A including the second resistor 431, the third resistor 433, the resistance temperature detector (RTD) 435, and the delay capacitor 427. In the example shown, the third resistor 633 is placed in parallel with the RTD 635 to cause the cause the delay capacitor 627 to charge with a predictable, temperature-compensated delay time even when the temperature of the current regulator 525 varies. The predictable, temperature-compensated delay time is produced in part by the resistance of the RTD 635 increasing with an increase in temperature, and in part by the RTD 635 and the third resistor 633 forming a voltage divider with the delay capacitor 627. The temperature reactive resistance increase of the RTD 635 means that, as temperature increases, less current is required from the current regulator 525 to cause the delay capacitor 627 to charge to the predetermined voltage threshold. Specifically, the current output of the current regulator 525 $I_{out}$ drops as temperature increases, but the parallel resistance of the third resistor 633 and the RTD 635 increase. The aforementioned temperature-dependent current drop and resistance increase counteract one another and reduce the negative effects on delay time caused by the temperature sensitivity of the current regulator 525.

In some examples, the RTC circuit 641 has a nominal resistance of 1 k, and the second resistor 631 and the third resistor 633 are similarly sized (e.g., in the 1 k-10 k range). However, the resistance of the RTC circuit 641, as a function of temperature T, is given by the following standardized equation:

$$P(T) = 1000\left(1 + 3.9083 \cdot 10^{-3}T - 5.775 \cdot 10^{-7}T^2 - 4.183 \cdot 10^{-12}T^3(T - 100)U(-T)\right)$$

Where U is the unit-step function.

In the arrangement of RTC circuit 641, the voltage of the delay capacitor 627 of the firing logic circuit 404 can be determined according to the equation:

$$V_{out} = V\frac{R13\|RTD}{R} = I_{out}(R13\|RTD)\left(1 - e^{-\frac{t}{RC}}\right)$$

Where:
R=R16+ (R13∥RTD), where R16 corresponds to the second resistor 631, R13 corresponds to the third resistor 633, and RTD corresponds to the RTD 635; and, $$V = I_{out}R\left(1 - e^{-\frac{t}{RC}}\right),$$

where t corresponds to the temperature-compensated delay time.

If $I_{out}$ is known, the charging time of the delay capacitor 627 (i.e., the temperature-compensated delay time), which should remain nearly constant over a wide temperature range, can be determined using the equation:

$$t(I_{out}) = -RC\ln\left(1 - \frac{2.5V}{I_{out}(R13\|RTD)}\right)$$

Where R13 corresponds to the third resistor 633, RTD corresponds to the RTD 635, and 2.5V is the assumed predetermined voltage threshold that the delay capacitor 627 is configured to charge to, in order to provide a proper delay time. However, the predetermined voltage threshold may be adjusted to yield a different delay time.

Combining the equations for $t(I_{out})$, P(T), and $I_{out}(R, T)$ allows the temperature-compensated delay time to be graphed as a function of the first resistor 529, the second resistor 631, the third resistor 633, the delay capacitor 627, and the temperature T of the temperature compensation circuit 413. Other factors that may contribute to the total delay time include the time for the current regulator 525 to turn on, the time for the second integrated circuit 437 and nearby transistors to turn on, and delays from other circuit components.

Figure 7:
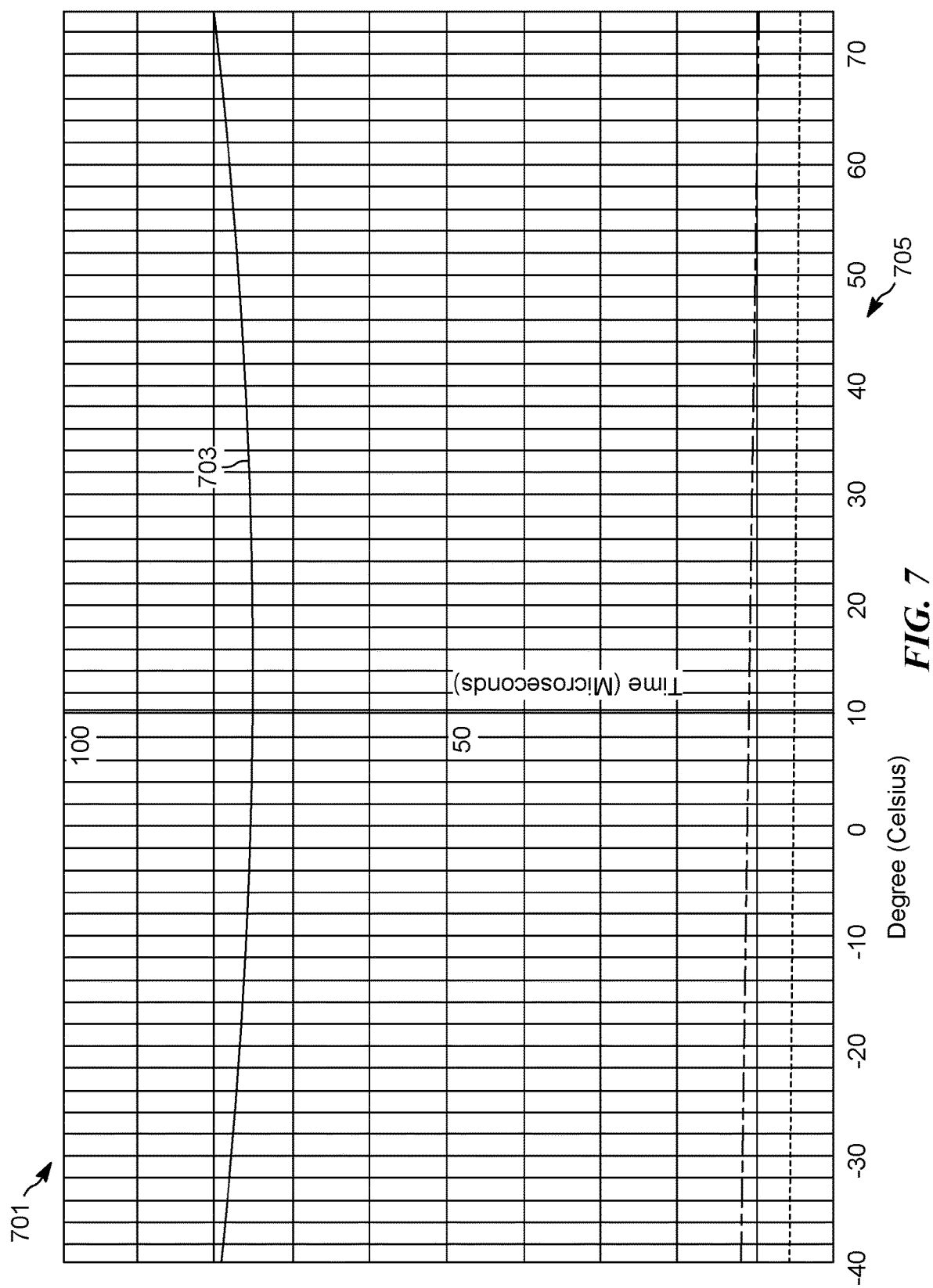
FIG. 7 depicts a graph of a temperature-compensated delay time, according to some examples.

FIG. 7 depicts a graph 701 of a temperature-compensated delay time 703. The principles and circuits disclosed herein have proven to provide a temperature-compensated delay time 703 that remains substantially constant over a range of temperatures 705. This type of temperature-compensated delay may be achieved with the system described herein.

Figure 8:
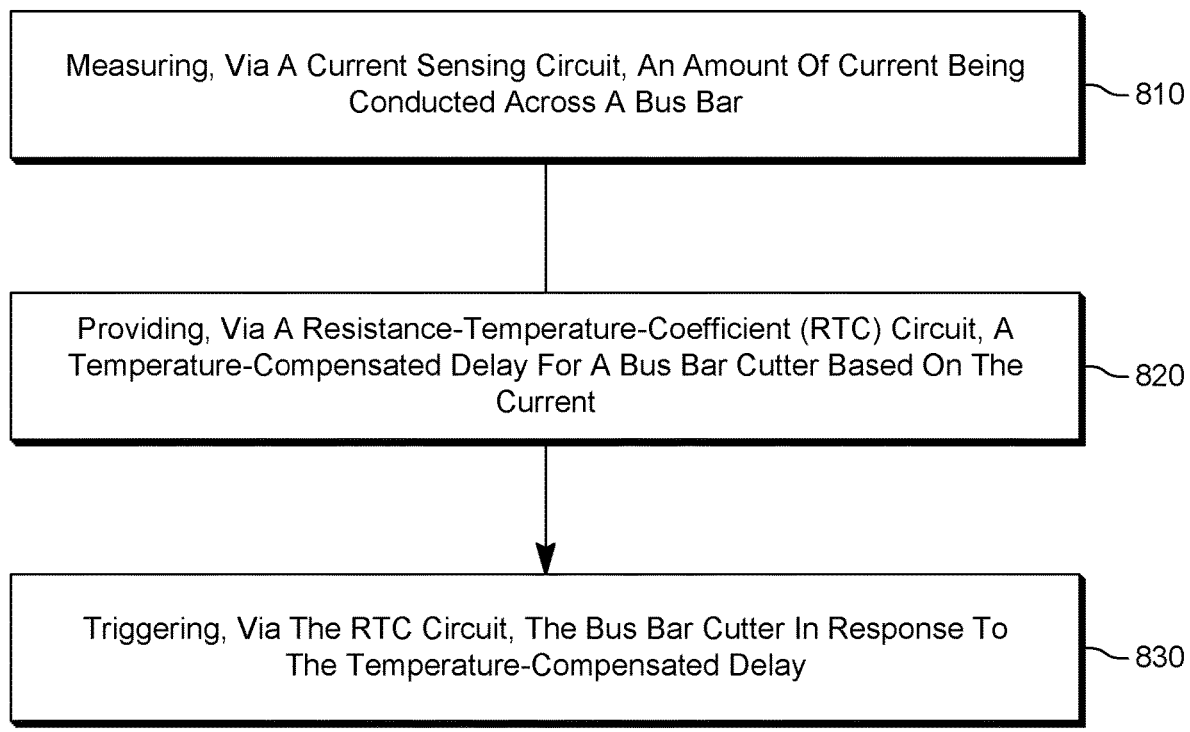
FIG. 8 is a flow chart for a method of controlling a circuit interrupter, according to some examples.

FIG. 8 is a flow chart for a method for controlling a circuit interrupter 101, 201, or 301. In particular, the method of FIG. 8 is effective in triggering a bus bar cutter 109, 209, or 309 of the circuit interrupter 101, 201, or 301 in response to a temperature-compensated delay.

At step 810, the current sensing circuit 405 measures an amount of current being conducted across a bus bar 107, 207, or 307. For example, a current sensing transformer of the current sensing circuit 405 may be used to measure a current flowing across a bus bar 107, 207, or 307 at a substation of a power distribution network.

At step 820, a temperature compensation circuit 413 including an RTC circuit 641 provides a temperature-compensated delay for a bus bar cutter 109, 209, or 309 configured to sever the bus bar 107, 207, or 307 based on the current measured by the current sensing circuit 405. For example, as described above, the RTC circuit 641 may provide a temperature-compensated delay for the bus bar cutter 109, 209, or 309 by helping to ensure that the delay capacitor 627 charges to a predetermined voltage threshold with a timing (e.g., 80 us to 100 μs) that is largely unaffected by temperature changes in the RTC circuit 641 or the current regulator 525.

At step 830, the temperature compensation circuit 413 triggers the bus bar cutter 109, 209, or 309 in response to the temperature-compensated delay. For example, at the expiration of the temperature-compensated delay (i.e., when the delay capacitor 627 charges to the predetermined voltage threshold) the second integrated circuit 437 signals the detonator firing circuit 409, causing the detonator firing circuit 409 to trigger the bus bar cutter 109, 209, or 309 to sever the bus bar 107, 207, or 307, thereby interrupting current flow in a circuit (e.g., in a circuit of a power distribution network).

Various embodiments, examples, features, and advantages are set forth in the following claims.

What is claimed is:

1. A circuit interrupter comprising:
a bus bar configured to conduct a current, the bus bar configured to connect to an electrical grid;
a bus bar cutter configured to sever the bus bar;
a temperature compensation circuit including a resistance-temperature-coefficient (RTC) circuit configured to provide a temperature-compensated delay; and, a detonator firing circuit configured to
trigger the bus bar cutter in response to the temperature-compensated delay, wherein the RTC circuit includes
a current regulator;
a first resistor connected to the current regulator;
a resistor capacitor network connected to the current regulator; and,
an integrated circuit configured to measure a voltage across a resistance temperature detector (RTD).

2. The circuit interrupter of claim 1, wherein the temperature-compensated delay is based on the voltage measured across the RTD.

3. The circuit interrupter of claim 1, wherein the resistor capacitor network includes
a capacitor connected to the current regulator;
a second resistor connected between the current regulator and the capacitor; and,
a third resistor connected in parallel with the RTD.

4. The circuit interrupter of claim 1, wherein the resistor capacitor network is configured to cause the temperature-compensated delay to remain constant as a temperature of the RTD changes.

5. The circuit interrupter of claim 1, wherein the bus bar is configured to displace as a result of being severed.

6. The circuit interrupter of claim 5, wherein a severing of the bus bar causes a commutation of the current into a current limiting fuse for a predetermined period.

7. A system comprising:
a temperature compensation circuit including a resistance-temperature-coefficient (RTC) circuit configured to provide a temperature-compensated delay for a bus bar cutter configured to sever a bus bar;
a detonator firing circuit configured to trigger the bus bar cutter in response to the temperature-compensated delay, and
a current sensing circuit configured to turn on the RTC circuit in response to detecting a predetermined amount of current being conducted across the bus bar,
wherein the RTC circuit includes
a current regulator;
a first resistor connected to the current regulator;
a resistor capacitor network connected to the current regulator; and,
an integrated circuit configured to measure a voltage across a resistance temperature detector (RTD).

8. The system of claim 7, wherein the temperature-compensated delay is based on the voltage measured across the RTD.

9. The system of claim 8, wherein triggering the bus bar cutter in response to the temperature-compensated delay includes triggering the bus bar cutter at an expiration of the temperature-compensated delay.

10. The system of claim 7, wherein the resistor capacitor network includes
a capacitor connected to the current regulator;
a second resistor connected between the current regulator and the capacitor; and,
a third resistor connected in parallel with the RTD.

11. The system of claim 7, wherein the resistor capacitor network is configured to cause the temperature-compensated delay to remain constant as a temperature of the RTD changes.

12. A method of controlling a circuit interrupter comprising:
measuring, via a current sensing circuit, an amount of current being conducted across a bus bar;
providing, via a temperature compensation circuit including a resistance-temperature-coefficient (RTC) circuit, a temperature-compensated delay for a bus bar cutter configured to sever a bus bar; and,
triggering, via the temperature compensation circuit, the bus bar cutter in response to the temperature-compensated delay, wherein triggering the bus bar cutter in response to the temperature-compensated delay includes triggering the bus bar cutter at an expiration of the temperature-compensated delay, wherein the RTC circuit includes a current regulator;

a first resistor connected to the current regulator;

a resistor capacitor network connected to the current regulator; and, an integrated circuit, and wherein the method further includes measuring a voltage across a resistance temperature detector (RTD) via the integrated circuit.

13. The method of claim 12, wherein the temperature-compensated delay is based on the voltage measured across the RTD.

14. The method of claim 12, wherein the resistor capacitor network includes a capacitor connected to the current regulator;

a second resistor connected between the current regulator and the capacitor; and, a third resistor connected in parallel with the RTD.

15. The method of claim 12, wherein the resistor capacitor network is configured to cause the temperature-compensated delay to remain constant.

* * * * *